United States Patent Office 2,997,081
Patented Aug. 22, 1961

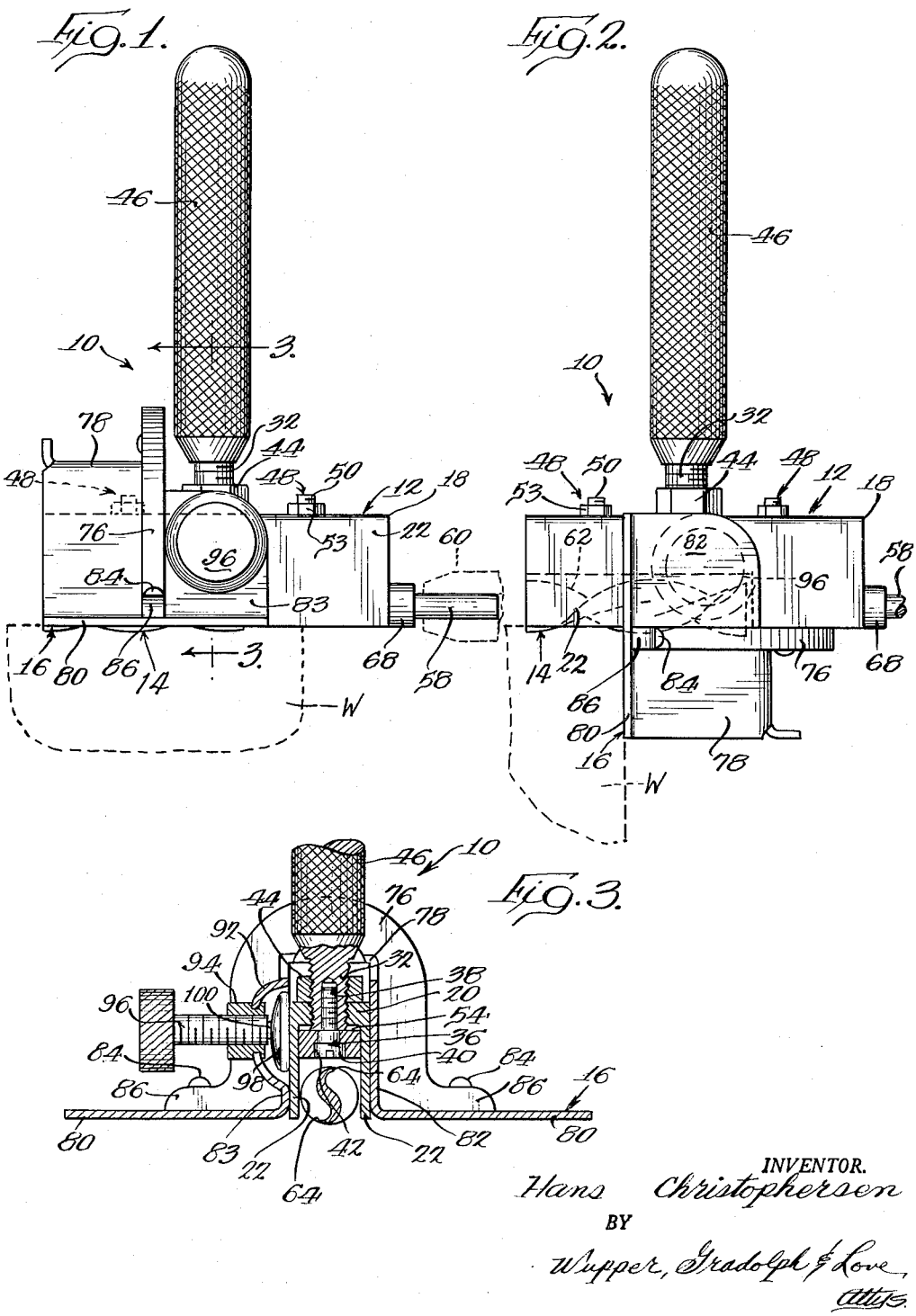

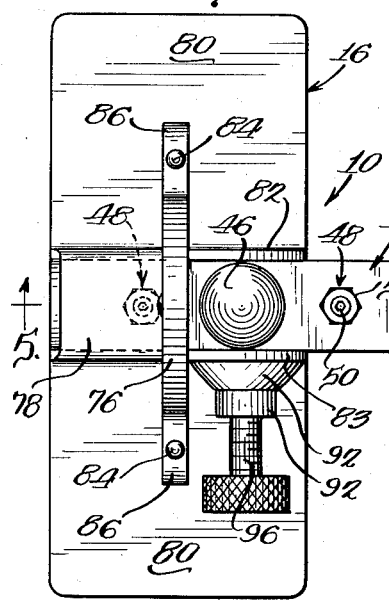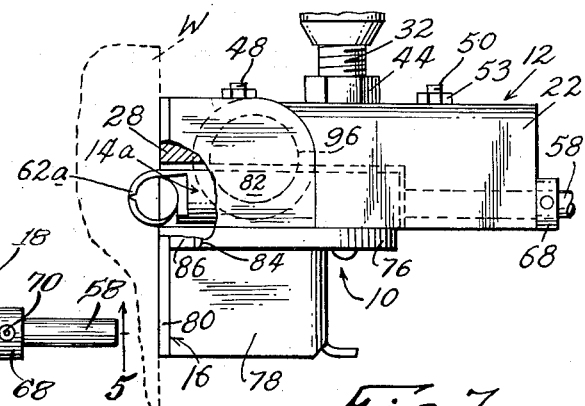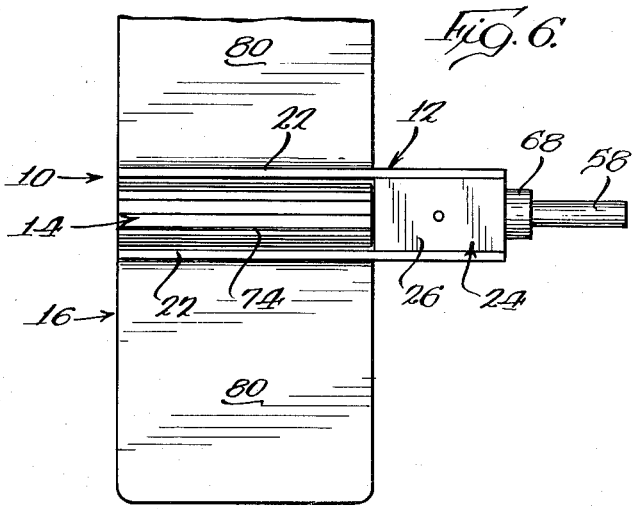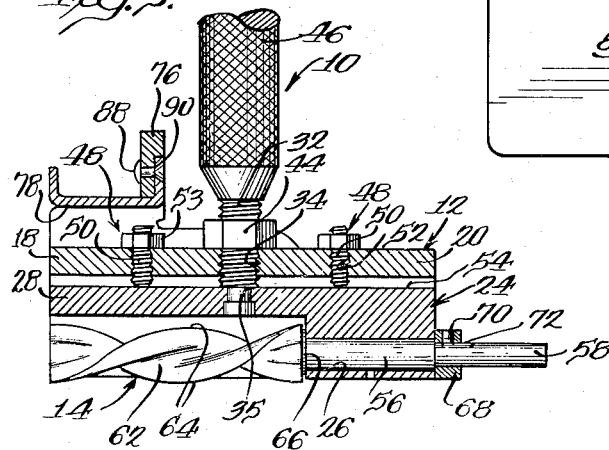

2,997,081
WOODWORKING TOOL
Hans Christophersen, 3707 Oak Ave., Northbrook, Ill.
Filed Feb. 9, 1960, Ser. No. 7,639
6 Claims. (Cl. 144—134)

This invention relates to a portable woodworking tool which may be used as a planer and a router, and which may be powered by an ordinary household or handyman's electric drill motor.

A difficulty with such portable planers and routers as are available on the market today is that they are relatively heavy and bulky and, as a result, they are hard to manipulate. Many of them are also topheavy and out of balance, the connection with their power source tending to throw them out of alignment.

In addition, a good combination tool should have a minimum of removable and adjustable parts so that the tool may be easily changed from its arrangement of parts for performing one operation to another.

Accordingly, the primary object of this invention is to provide a planer and router in combination, which is easily portable and easily powered and manipulatable.

Another object is to provide a portable combination planer and router which has a minimum of removable and adjustable parts which can easily be changed from one function to the other.

Another object is to provide a combination planer and router having a movable guide for changing the character of the tool for planing and routing operations.

Other objects and advantages will become apparent from the following description taken in conjunction with the accompanying drawings wherein:

FIG. 1 is a side elevation of the tool arranged as a planer, with the drill chuck shown in dotted lines;

FIG. 2 is a side view with the guide in such position as to enable the tool to be used as an edge planer;

FIG. 3 is a vertical sectional view taken along the line 3—3 of FIG. 1, looking in the direction of the arrows;

FIG. 4 is a plan view of the tool as shown in FIG. 1;

FIG. 5 is a vertical, longitudinal, sectional view taken along the lines 5—5 of FIG. 4, looking in the direction of the arrows;

FIG. 6 is a bottom view of the tool used as a planer with another form of cutting head, and FIG. 7 is a fragmentary side view of the tool, partially broken into section, showing use of the tool as a router.

Referring to the drawings, the tool, which is indicated in its entirety by the reference character 10, comprises a housing 12 which encloses a wood-working element 14 and a guide 16 adjustably clamped to the housing 12.

The housing 12, which may be of die-cast aluminum, is an elongated body 18 having a top wall 20 and a pair of depending side walls 22, giving the housing a transverse inverted U-shape open at both ends and along one side.

Enclosed within the housing is an elongated support 24 for the woodworking tool element 14, and it comprises a member preferably made of bronze or similar material having a bearing 26 formed at one end to be positioned in one end of the housing and an integral finger 28 extending toward the opposite end of the housing from the bearing. The finger 28 overlies the wood-working element 14 and supports the bearing 26 and, therefore, the tool element within the housing 12.

The support comprises a screw element 32 threaded through a tapped opening 34 in the top wall 20 of the housing with its lower end 35 butted against the top surface 54 of the finger 28. The screw 32 is rotatably secured to the tool support 24 and its finger 28 by a bolt 36 which is threaded into a tapped opening 38 in the screw 32 in such fashion that it is not readily removable therefrom, and when the screw 32 is rotated, the bolt 36 also rotates. The head 40 of the bolt 36 is turnable in a counterbored aperture 42 in the finger 28. Inasmuch as this screw 32 is threaded through the opening 34 in the housing wall 20, rotation of it in one direction or the other moves the support element 24 in and out of the housing. The screw element 32 is locked in any adjusted position by a lock nut 44 which may be threaded tightly against the outer surface of the housing wall 20.

In the form of the tool shown, the screw 32 is formed integrally with a handle 46 which upstands from the tool housing 12 and is useful in rotating the screw to adjust the position of the support 24 and the wood-working element 14 within the housing, and also to manipulate the tool during its use.

A pair of adjustable stops 48 are provided which comprise Allen bolts or screws 50 threaded through tapped openings 52 in the top wall 20 of the housing and lock nuts 53. When it is desired to adjust the position of the support 24, the Allen bolts 50 are threaded outwardly of the housing and away from the support 24, thereby loosening the assembly permitting greater facility in loosening the lock nut 44. The position of the two stop bolts 50 is adjusted and the handle 46 is rotated in the clockwise direction to draw the support 24 inwardly of the housing so that its upper surface 54 contacts the ends of the bolts 50, thus properly positioning the support 24 and the wood-working element 14. The lock nuts 54 for the stop bolts 50 are tightened, and the lock nut 44 for the adjusting screw element 32 is tightened, thus readying the tool for use.

The wood-working tool element 14 is formed integrally, and comprises a bearing portion 56 which is rotatable in the support bearing 26, a projecting shaft or shank 58, which is adapted to be held in the conventional chuck 60 of a ¼ inch drill (FIG. 1, drill not shown), and a blade end 62. In the particular form of the tool shown in FIGS. 1 to 5, the blade end 62 comprises a reverse S-shaped blade (as seen in FIG. 3) having cutting edges 64 and which, in the particular form shown, is made by heating and twisting a double-edged blade which had been formed on the integral tool element 14. The blade end of the tool element is formed with a thrust bearing portion 66 adapted to be held against the inner end of the support bearing 26. The tool element 14 is retained in the housing and readily removable therefrom by a collar 68 carrying an Allen set screw 70 adapted to be turned against a flatted portion 72 on the protruding shank or shaft 58, with the collar bearing against the outer face of the support bearing 26 during use of the tool.

A modified form of wood-working tool element 14 is shown in FIG. 6, and is generally formed with planer type blades 74 to indicate the versatility of the tool.

The guide 16, which is adjustably mounted on the housing 12, includes a horseshoe-shaped frame 76 embracing a tunnel-shaped housing 78 which projects away from the frame 76 in one direction and which has integrally formed therewith a pair of sidewardly extending wings 80. The housing 78 includes a pair of side walls 82 and 83 which embrace the housing 12 and pass through the frame 76. The wings 80 and housing portion 78 are fastened to the frame 76 by rivets 84 extending through outwardly projecting portions 86 of the frame, and by a rivet 88 fastened through the top of the frame and a turned up lip 90 on the crown of the tunnel-shaped housing 78.

The side wall 83 is belled outwardly at 92 to form a cavity facing toward the opposite wall 82 to which a tapped bushing 94 is permanently secured. A thumb screw 96 is threaded through the bushing 94 and has a pad 98 rotatably fastened, as by peening, to a reduced diameter inner end 100 of the thumb screw 96. When the guide 16 has been properly positioned on the housing 12, the thumb screw 96 is tightened to bring the pad 98 against one of the side walls 22 of the housing, thereby locking the guide 16 in the appropriate adjusted position.

It will be noted, particularly from FIG. 3, that the wings of flanges 80 of the guide 16 have coplanar outer faces, and when the tool is to be used for a planing operation of one kind, the wings 80 are adjusted so that their lower surfaces lie in the same plane as the lower edges of the housing side walls 22, thereby permitting projection of the wood-working blade 62 from the assembly the predetermined distance to engage the surface of the workpiece W to be planed.

When the tool is to be used for a planing operation of another kind, the guide 16 is positioned so that the frame 78 lies across the open face of the housing 12 and the guide wings 80 are disposed vertically to contact an edge of the workpiece W with the blade 62 overlying the surface to be planed. Of course, they may be disposed at an angle to the lower edge of the housing, thereby giving the cut a shape other than merely flat. It is thus possible to taper the cut up toward a flat surface or to take a downwardly inclined cut from the edge of the surface being worked.

When the tool 10 is to be used as a router, a routing tool element 14a is mounted in the housing 12 with the working blade portion 62a thereof projecting from the housing at the open end thereof opposite the bearing 26, or the left end as seen in FIG. 7. The guide structure 16 is mounted on the housing in the manner shown in FIG. 7 with the guide wings 80 coplanar with the open end of the housing 12 or somewhat outwardly or leftwardly thereof and in a position to engage the blade portion 62a with the workpiece W in which a routing cut is to be made. The guide 16 may be mounted in an angular position, if desired, so as to obtain special cutting effects.

From the foregoing description, it will be appreciated that the objectives which were claimed for this invention at the outset of this specification are attained.

While preferred embodiments of the invention have been disclosed and described, it will be apparent that numerous modifications and variations thereof may be made therein without departing from the underlying principles of the invention. It is therefore desired by the following claims to include all such variations and modifications whereby substantially the results of this invention may be attained by the use of the same or substantially equivalent means.

What is claimed as new and desired to be secured by United States Letters Patent is:

1. In a portable woodworking tool, the combination comprising, a longitudinally extending housing open at both ends and along one side, means forming a bearing mounted in one end of said housing, a shaft journaled in said bearing and having an end projecting from said one end of said housing and adapted to be inserted into a chuck of a power means, a woodworking tool element fixed to the other end of the shaft and housed in the other end of said housing with a portion thereof projecting from said housing at a position to engage the work, a handle attached to said housing opposite said open side to facilitate manipulation of the tool, a guide having sidewardly extending, coplanar wings, and means adjustably mounting said guide on said housing in any of a variety of positions to guide the projecting portion of the tool element into engagement with the work.

2. In a portable woodworking tool, the combination comprising, a U-shaped longitudinally extending housing open at both ends and along one side, means forming a bearing, means adjustably mounting said bearing in one end of said housing, a shaft journaled in said bearing and having an end projecting from said one end of said housing and adapted to be inserted into a chuck of a power means, cutter means fixed to the other end of the shaft and housed in the other end of said housing with a portion thereof projecting from the open side of said housing, the position of said adjustable bearing mounting means determining the amount of projection of said cutter means from the open side of said housing, a handle attached to said housing opposite said open side to facilitate manipulation of the woodworking tool, a guide having sidewardly extending, coplanar wings and a portion straddling said housing, and means carried by said housing straddling portion for adjustably mounting said guide on said housing in any of a variety of positions as dictated by the type of cut to be made in the work.

3. In a portable woodworking tool, the combination comprising, a U-shaped longitudinally extending housing open at both ends and along one side, means forming a bearing, a screw threaded through the housing wall opposite said open side and rotatably fixed to said bearing forming means for adjustably mounting said bearing in one end of said housing, a shaft journaled in said bearing and having an end projecting from said one end of said housing and adapted to be inserted into a chuck of a power means, cutter means fixed to the other end of the shaft and housed in the other end of said housing with a portion thereof projecting from the open side of said housing, the position of said adjustable bearing mounting means determining the amount of projection of said cutter means from the open side of said housing, and a handle attached to said screw to facilitate adjustment of the position of said bearing forming means and manipulation of the tool.

4. In a portable woodworking tool, the combination comprising, a U-shaped longitudinally extending housing open at both ends and along one side, a tool support extending the length of said housing having a bearing at one end, a screw threaded through the housing wall opposite said open side and rotatably fixed to said tool support for mounting said tool support in said housing, adjustable stop means carried by said housing wall and bearing against said tool support, means for locking said screw and said stop means in adjusted positions, a shaft journaled in said bearing and having a shank projecting from said housing and adapted to be inserted into a chuck of a power means, cutter means fixed to the other end of the shaft and enclosed within said housing with a portion thereof projecting from the open side of said housing, the position of said tool support determining the amount of projection of said cutter means from the open side of said housing, and a handle attached to said screw to facilitate adjustment of said tool support and manipulation of the tool.

5. In a portable woodworking tool, the combination comprising, a U-shaped longitudinally extending housing open at both ends and along one side, means forming a bearing, means mounting said bearing in one end of said housing, a shaft journaled in said bearing and having an end projecting from said one end of said housing and adapted to be inserted into a chuck of a power means, cutter means fixed to the other end of the shaft and housed in the other end of said housing with a cutting portion thereof projecting from said housing in a position to engage the work, a guide having sidewardly extending, coplanar wings and a portion straddling said housing, and means adjustably mounting said guide on the housing in any of a variety of positions as dictated by the type of cut to be made by said cutter means.

6. In a portable woodworking tool, the combination comprising, a U-shaped longitudinally extending housing open at both ends and along one side, means forming a bearing, means mounting said bearing in one end of said housing, a shaft journaled in said bearing and having an end projecting from said one end of said housing and adapted to be inserted into a chuck of a power means, cutter means fixed to the other end of the shaft and housed in the other end of said housing with a portion thereof projecting from the open side of said housing, a guide including a U-shaped frame adapted to embrace said housing and a pair of sidewardly extending, coplanar wings, and means adjustably mounting said guide on said housing in any of a variety of positions as dictated by the type of cut to be made by said cutter means.

References Cited in the file of this patent

UNITED STATES PATENTS

| | | |
|---|---|---|
| 1,296,910 | Bloodgood | Mar. 11, 1919 |
| 1,736,965 | Carter | Nov. 26, 1929 |
| 1,883,392 | Moll | Oct. 18, 1932 |
| 2,520,875 | Birchmeier | Aug. 29, 1950 |
| 2,610,658 | Koeling | Sept. 16, 1952 |
| 2,705,513 | Moeller | Apr. 5, 1955 |
| 2,771,104 | Saxe | Nov. 20, 1956 |

FOREIGN PATENTS

| | | |
|---|---|---|
| 611,948 | Great Britain | Nov. 5, 1948 |